No. 608,868. Patented Aug. 9, 1898.
S. KAUFMANN.
COOKING UTENSIL.
(Application filed Sept. 30, 1897.)

(No Model.) 2 Sheets—Sheet 1.

Witnesses,
Robert Everett
H. B. Keefer

Inventor:
Sophie Kaufmann,
By James L. Norris.
Atty.

No. 608,868. Patented Aug. 9, 1898.
S. KAUFMANN.
COOKING UTENSIL.
(Application filed Sept. 30, 1897.)
(No Model.) 2 Sheets—Sheet 2.
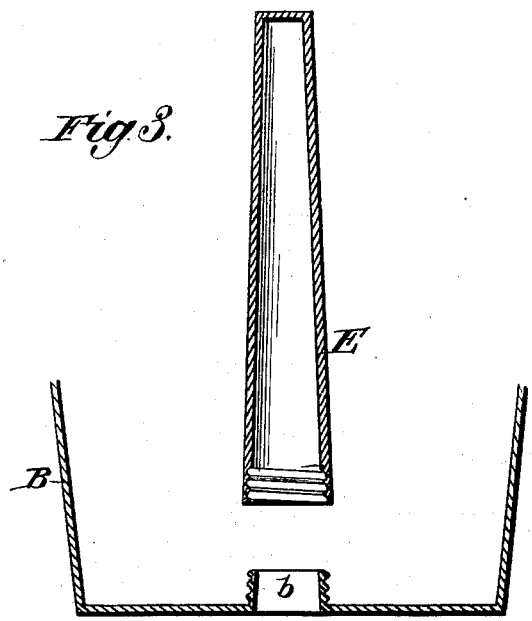
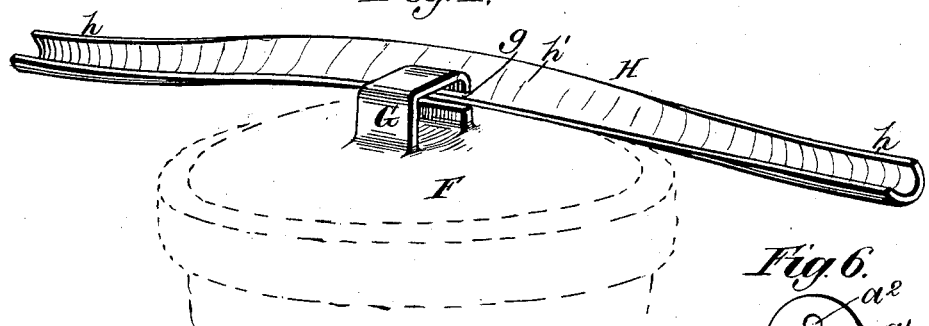
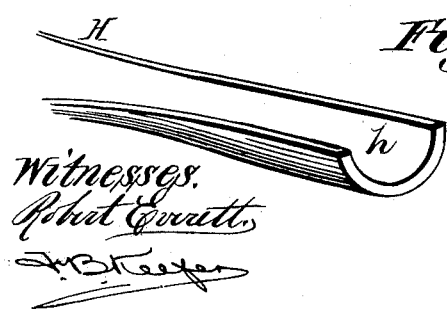
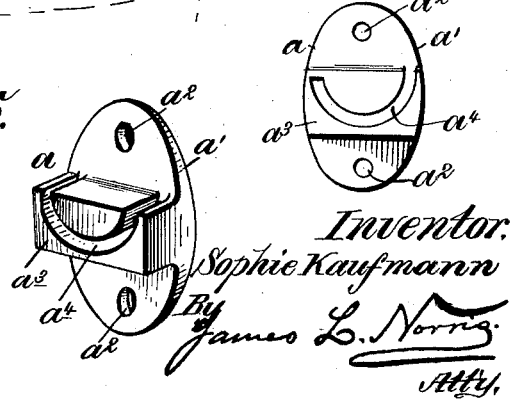
Inventor:
Sophie Kaufmann
By James L. Norris
Atty.
Witnesses:
Robert Everett
H. B. Keefer

UNITED STATES PATENT OFFICE.

SOPHIE KAUFMANN, OF JEANNETTE, PENNSYLVANIA.

COOKING UTENSIL.

SPECIFICATION forming part of Letters Patent No. 608,868, dated August 9, 1898.

Application filed September 30, 1897. Serial No. 653,623. (No model.)

*To all whom it may concern:*

Be it known that I, SOPHIE KAUFMANN, a citizen of the United States, residing at Jeannette, in the county of Westmoreland and State of Pennsylvania, have invented new and useful Improvements in Cooking Utensils, of which the following is a specification.

My invention relates to an improved cooking utensil of the class in which one vessel is supported within an outer larger vessel or boiler containing water.

It is the object of my invention to provide a utensil of this kind designed more especially for cooking puddings, but not limited in use to such application.

Further objects of the invention relate to the provision and arrangement of certain parts for maintaining the inner vessel in fixed relation with the outer vessel.

Still further objects of the invention relate to certain details of construction, which will more clearly hereinafter appear.

Figure 1:
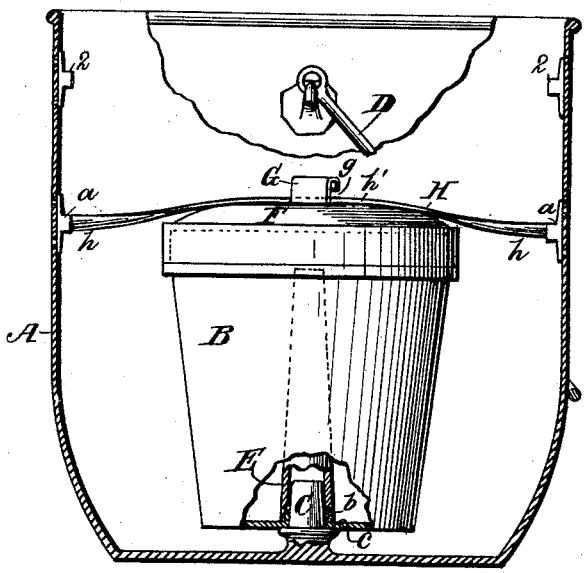
Figure 2:
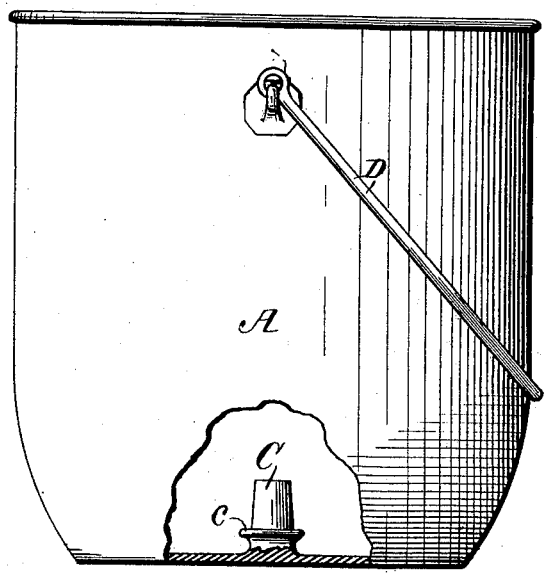

In the drawings illustrating my invention, Figure 1 is a view in sectional elevation, showing the various parts of the device assembled in operative position. Fig. 2 is a side elevation, partly broken away, of the outer vessel. Fig. 3 is a sectional view of a portion of the inner vessel, showing the center piece removed. Fig. 4 is a perspective view of the lid, showing the keeper thereon and the locking-bar about to be inserted therein; and Fig. 5 is a view in detail of the lock and one end of the locking-bar. Fig. 6 is a view of a modified form of lock.

The letter A designates the outer vessel, which I will call the "boiler," and B the inner vessel, which I will term the "pudding-form." Said boiler A may be made of tin, cast or sheet iron, or, in fact, of any material suitable for the purpose, and has extending upward from its bottom and preferably formed integral therewith a supporting-stud C. It is also provided with the usual handle D. The pudding-form B is preferably made of cast-iron to permit it to be suitably enameled, and has extending upward from its bottom and preferably formed integral therewith a tubular projection $b$, having screw-threads on its outer portion. When in position, said tubular portion receives the stud C and fits snugly around the same, while the bottom of the pudding-form B rests on the shoulder $c$ of said stud. A tubular center piece E, having at its lower end interior screw-threads, is screwed on the tubular projection $b$.

The letter F indicates the lid for the pudding-form. This lid has on its top and preferably formed integral therewith a keeper G. (Shown in detail in Fig. 4.) As shown, this keeper is cut away at one side to form an opening $g$, for a purpose to be presently described. The keeper G serves also as a handle for the lid $f$. On the inner opposite sides of the boiler A are provided locks $a$, one of which is shown in enlarged detail in Fig. 5. This lock is cast in one piece from iron and has a base portion $a'$, provided with screw or bolt holes $a^2$, whereby it may be attached to the sides of the boiler by means of suitable bolts or screws, and an outward-projecting squared portion $a^3$, having therein a horizontally-extending semicircular groove or channel $a^4$, open at its outer and top sides. In Fig. 6 I have shown a modified form of this lock, in which the groove or channel $a^4$ is closed at one end to limit the movement of the locking-bar therein.

The letter H indicates the locking-bar. This bar is made from a suitable piece of metal having its end portions $h$ shaped substantially semicircular in cross-section to adapt them to fit in the grooves $a^4$ and being substantially flat in its central portion $h'$, which is adapted to pass through the opening $g$ in the keeper G. A second pair of locks 2 may be provided near the top of the boiler in case it is desired to use a larger sized pudding-form.

I have shown the boiler A as sufficiently large to accommodate a pudding-form of greater capacity than the one illustrated. Where only one size of pudding-form is used, the boiler A can be made much smaller.

By providing the locks $a$ with semicircular grooves and the locking-bar H with ends shaped to be turned into engagement with said grooves I obtain a locking device the parts of which are not liable to be accidentally disengaged, as the locking-bar, owing to the configuration of its ends, must be turned in order to be taken out of engagement with the locks.

The parts are assembled and the operation is as follows: The tubular center piece E is screwed on the projection $b$, and the material for the pudding or other article to be cooked is poured into the pudding-form B, which is then placed on the stud C. The lid F is then placed on the pudding-form and the locking-bar is applied to hold the pudding-form in place. This is done by applying the edge of the flat portion $h'$ to the opening $g$ and the edges of the curved ends $h$ to the tops of the grooves $a^4$, when the bar is partially turned or rotated, which will cause the ends $h$ to slide into engagement with the grooves $a^4$ and the flat central portion to enter the opening $g$ in the keeper G. A sufficient amount of water is then placed in the boiler A and the device is placed on the stove. When the material in the pudding-form B has sufficiently cooked, the locking-bar H is turned in the reverse direction to that described, which will cause its ends to pass out of the grooves $a^4$ of the locks $a$ and its central portion to pass out of the opening $g$. The pudding-form may now be removed from the boiler. When it is desired to remove the pudding from the pudding-form, the center piece E may be unscrewed from engagement with the projection $b$ and be removed from the pudding-form with the pudding, and subsequently be taken out of the latter.

By making the parts of my cooking utensil removable, as shown, they may be readily cleaned, and being simple in construction they are easily assembled.

It will be apparent that the pudding-form may be removed from the outer boiler and used alone for baking purposes, and in the manufacture of the device the said pudding-form would be constructed with such end in view.

While I have shown and described the keeper G as having an opening $g$, it is apparent that said keeper may be an ordinary open handle in common use and the locking-bar be run through the same before being locked in position.

Having thus fully described my invention, what I claim is—

1. A cooking utensil comprising in combination, an outer vessel having an upward-extending supporting-stud on its bottom, an inner vessel supported on said stud and having an upward-extending tubular portion in its bottom, a center piece removably secured to said tubular portion, and means for maintaining the inner vessel in fixed relation with said stud, substantially as described.

2. A cooking utensil comprising, in combination, an outer vessel having stops or projections on its inner sides provided with semicircular grooves, an inner vessel supported therein, and means for locking said inner vessel in position comprising a locking-bar engaging in its middle portion the top of said inner vessel and at its ends the grooves in the stops or projections on the outer vessel, substantially as described.

3. A cooking utensil comprising in combination, an outer vessel having stops or projections on its inner sides provided with semicircular grooves, an inner vessel supported therein, a lid for said inner vessel having on its upper surface a keeper, and means for locking said inner vessel in position comprising a locking-bar engaging said keeper, in its middle portion, and at its ends the grooves in said stops or projections, substantially as described.

4. A cooking utensil comprising in combination, an outer vessel, an inner vessel supported therein having a lid, and means for locking said inner vessel in position comprising a keeper on the lid having an opening therein, projections on the inner opposite sides of the outer vessel having semicircular grooves therein, and a locking-bar engaging at its ends said grooves and in its central portion said keeper, substantially as described.

5. A cooking utensil comprising, in combination, an outer vessel, an inner vessel supported therein having a lid, and means for locking said inner vessel in position comprising a keeper on the lid having an opening therein, projections on the inner opposite sides of said outer vessel having semicircular grooves therein, and a locking-bar having its end portions shaped semicircular in cross-section to engage the grooves in the projections and its middle portion flat to engage the keeper through its opening, substantially as described.

6. A cooking utensil consisting of an outer vessel having in its bottom an upward-extending stud provided with a shoulder, an inner vessel supported on said shoulder and having an upward-extending, screw-threaded tubular portion adapted to receive said stud, a center piece having screw-threaded engagement with said tubular portion, a lid for said inner vessel having on its upper surface a keeper, and means engaging in its central portion said keeper and at its ends the inner sides of the outer vessel, whereby to maintain the inner vessel in fixed relation with said stud, substantially as described.

7. The locking mechanism herein described for maintaining an inner cooking vessel in fixed relation with an outer containing vessel, comprising lock-pieces having semicircular grooves therein and a locking-bar having its ends shaped semicircular in cross-section to engage with said grooves, substantially as described.

8. The locking mechanism herein described for maintaining an inner cooking vessel in fixed relation with an outer containing vessel, comprising lock-pieces having semicircular grooves therein, one end of said grooves being closed, and a locking-bar having its ends shaped semicircular in cross-section to engage with said grooves, substantially as described.

In testimony whereof I have hereunto set my hand in presence of two subscribing witnesses.

SOPHIE KAUFMANN.

Witnesses:
M. D. KAUFMANN,
J. C. TAYLOR.